United States Patent [19]

Hallen

[11] Patent Number: 4,732,290
[45] Date of Patent: Mar. 22, 1988

[54] LOAD ISOLATING GAS WELL

[75] Inventor: Walter R. Hallen, Oconomowoc, Wis.

[73] Assignee: Rexnord Inc., Brookfield, Wis.

[21] Appl. No.: 860,599

[22] Filed: May 7, 1986

[51] Int. Cl.⁴ ............................................. B65D 87/08
[52] U.S. Cl. .................................... 220/5 A; 220/1 B; 220/216; 220/221; 220/222; 220/227
[58] Field of Search ............... 220/5 A, 1 B, 216, 221, 220/222, 227

[56] References Cited

U.S. PATENT DOCUMENTS

| | | | |
|---|---|---|---|
| 1,911,988 | 5/1933 | Chevalier | 220/85 |
| 1,917,622 | 7/1933 | Wiggins | 220/85 |
| 2,855,966 | 10/1958 | Lewis | 150/0.5 |
| 4,060,175 | 11/1977 | Rysgaard, Sr. | 220/85 B |
| 4,437,987 | 3/1984 | Thornton | 210/137 |

FOREIGN PATENT DOCUMENTS 111198 12/1964 Netherlands.

Primary Examiner—Joseph Man-Fu Moy
Attorney, Agent, or Firm—Michael, Best & Friedrich

[57] ABSTRACT

A floating as well for a covered gas storage tank is provided which rests on the tank cover until enough gas is introduced into the tank to inflate a gas collection membrane. The stress loads created by an increasing volume of stored gas on the gas collection membrane are diverted from the tank cover and through a series of cables attached to the floating gas well. The stress load is ultimately transmitted to the tank wall.

7 Claims, 7 Drawing Figures

LOAD ISOLATING GAS WELL

BACKGROUND OF THE INVENTION

The present invention relates to tanks designed to hold gas or volatile liquids, and more particularly, is designed to improve tanks which store pressurized gas, either in conjunction with a natural gas supply system, or an anaerobic wastewater treatment digester.

In the case of anaerobic digesters, gases, typically methane and carbon dioxide, are given off and collected to be used as the fuel for heating the sludge mixture. Traditional storage tanks employ a floating gas holder positioned above the sludge which collects the gas and provides a controllable downward force thereon, pressurizing the gas and making it immediately usable by the sludge heating equipment.

These tank facilities must meet environmental limitations concerning the discharge of gases into the atmosphere. Careful monitoring and control of the gases produced during the anaerobic process is essential, since the gases frequently are explosive when mixed with ambient atmospheric air. The conventional floating gas holder, while workable in theory, is subject to corrosion, freezing, tipping and gas leakages, all of which substantially interfere with its effective operation to properly control the gas within the tank.

Attempts have been made to solve the deficiencies of the common floating gas holder by providing the digester with a fixed outer cover and a flexible, pressurized gas retention membrane underneath. U.S. Pat. No. 4,060,175 to Rysgaard, discloses such a membrane connected to a vertically slidable stack equipped with pressure release and flame arrester system. A flowable granular ballast material placed upon the membrane near the tank wall serves as the pressure regulating mechanism.

In operation, the Rysgaard systems have proved to be impractical, largely due to the unwieldy nature of the ballast used to exert pressure on the membrane, as well as the inability of the flexible membrane to retain the ballast and simultaneously maintain a gas-proof seal.

Commonly-assigned U.S. Pat. No. 4,437,987 to Thornton, et al. discloses a digester cover with a fixed outer cover and a fixed center gas well, to which inner and outer flexible membranes are affixed. The inner membrane collects the digester gas. The cavity between the inner and outer membranes is filled with pressurized air as the gas pressure regulating means. The Thornton, et al. system has overcome most of the drawbacks of the Rysgaard and floating gas well designs, but the cost of constructing the fixed outer dome has rendered the system noncompetitive as compared to conventional floating gas holder designs.

The fixed cover and gas well assembly is necessary to provide the following features: a means of mounting pressure/vacuum release systems; a support means to prevent a deflated membrane from falling into the sludge or being impaled upon an internal projection such as a pipe; a means of introducing air between the membranes without penetrating either membrane; and the provision of access to the interior of the tank for periodic cleaning.

Thus, it is an object of the present invention to provide a digester gas collection system with a low-cost, yet structurally sound gas well support structure and a flotaing gas well with maintenance access means.

It is a further object of the present invention to provide a flexible membrane gas collection system which exerts minimal loading on the gas well support structure.

SUMMARY OF THE INVENTION

A gas collection and storage system including dual storage membranes and a supported gas well is provided for use in conjunction with a tank and is designed to prevent the transmission to the gas well support structure of excessive and potentially damaging stress loads exerted by stored gas.

More specifically, the present invention comprises a gas storage tank, preferably circular in shape and having a peripheral support wall. A rigid gas well support structure is provided. A gas well is floatably seated on the support structure and is provided with a downwardly depending concentric portion. A plurality of flexible support members such as cables emanate radially from the concentric portion, and are pivotally connected thereto. The free ends of the cables are pivotally secured to the tank wall.

Two flexible gas retention membranes are sealingly secured at one end to the downwardly extending concentric portion of the well at a location below that of the cable attachment points. The free ends of the membranes are sealingly secured to the tank wall.

When the tank is free of gas, the gas well rests on the support structure. As gas is introduced into the tank, and begins to exert pressure on the retention membrane, the resulting stress is transmitted via the cables to the tank wall. The cables are designed to have a length which, under pressurized conditions, permits free lateral movement of the gas well but limits its vertical movement. In this manner, stress loading on the gas well support structure is substantially reduced, allowing for cost effective reductions in gas well support structure configuration and materials.

BRIEF DESCRIPTION OF THE DRAWINGS

The invention and its many attendant objects and advantages will become better understood by reference to the following drawings, wherein.

DESCRIPTION OF THE PREFERRED EMBODIMENT

Figure 1:
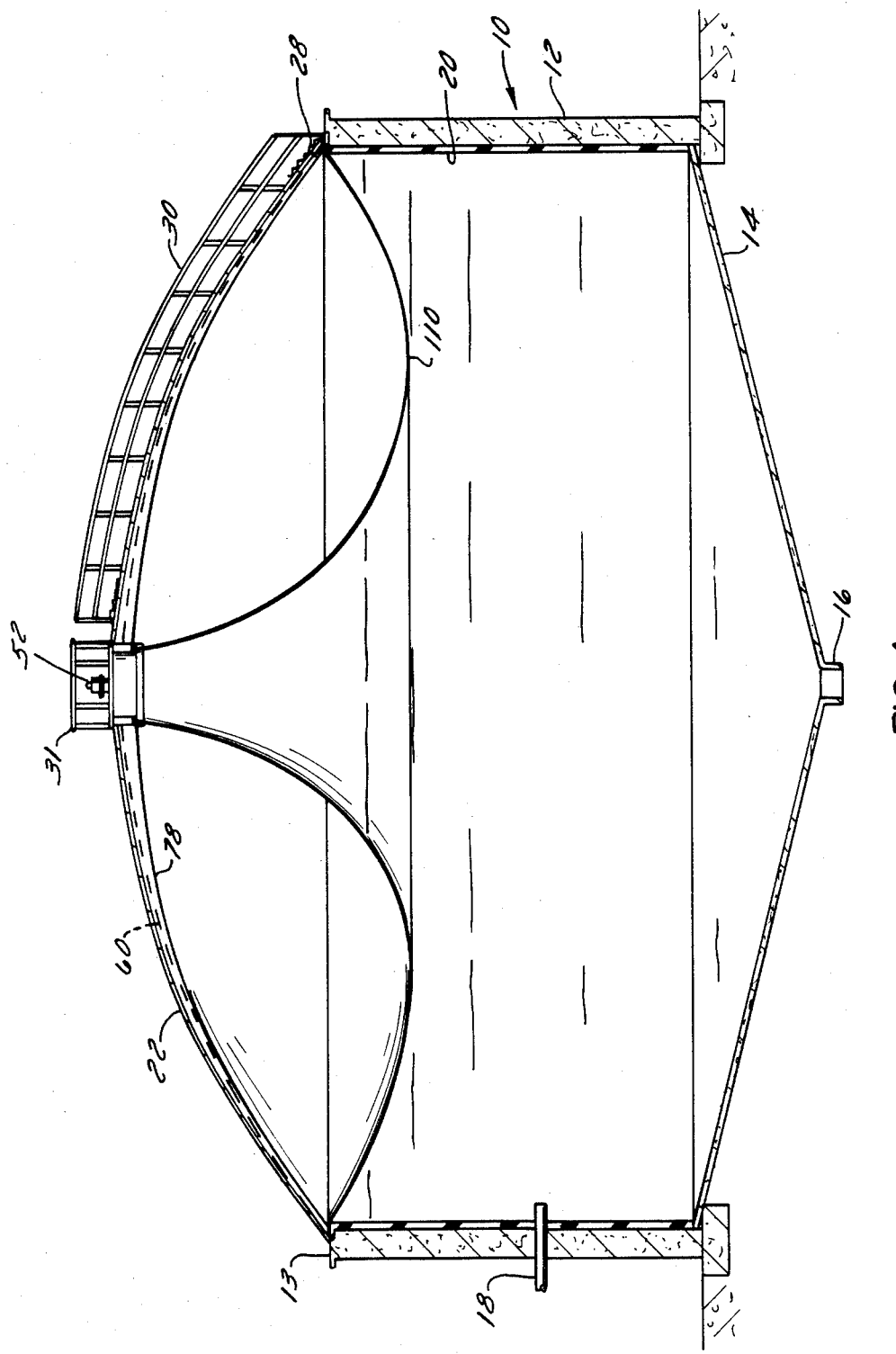
FIG. 1 is a side elevation in partial section of a gas storage tank equipped with the gas collection system of the present invention.
Figure 2:
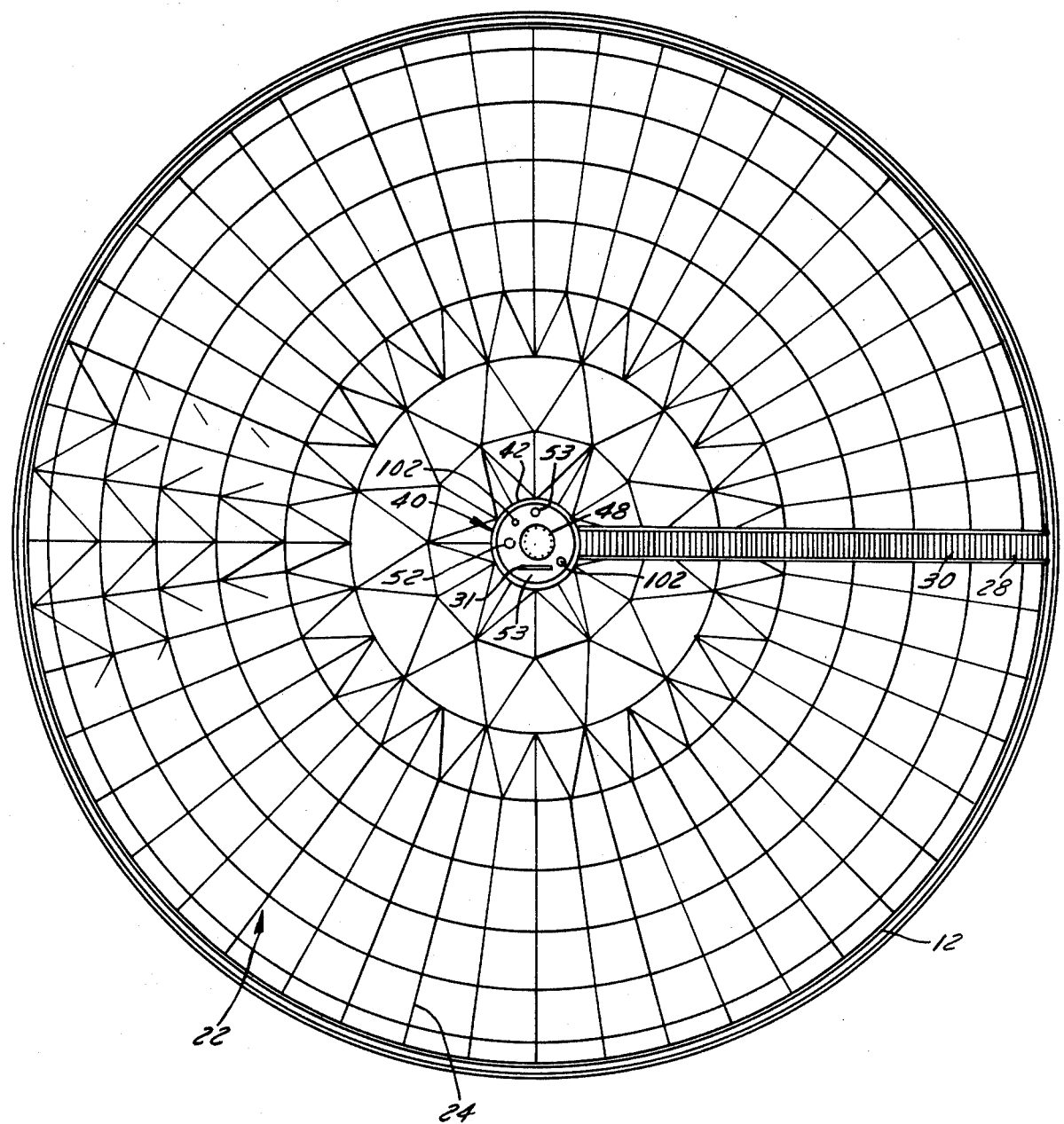
FIG. 2 is a plan view of the gas well support structure framework of the tank shown in FIG. 1.
Figure 3:
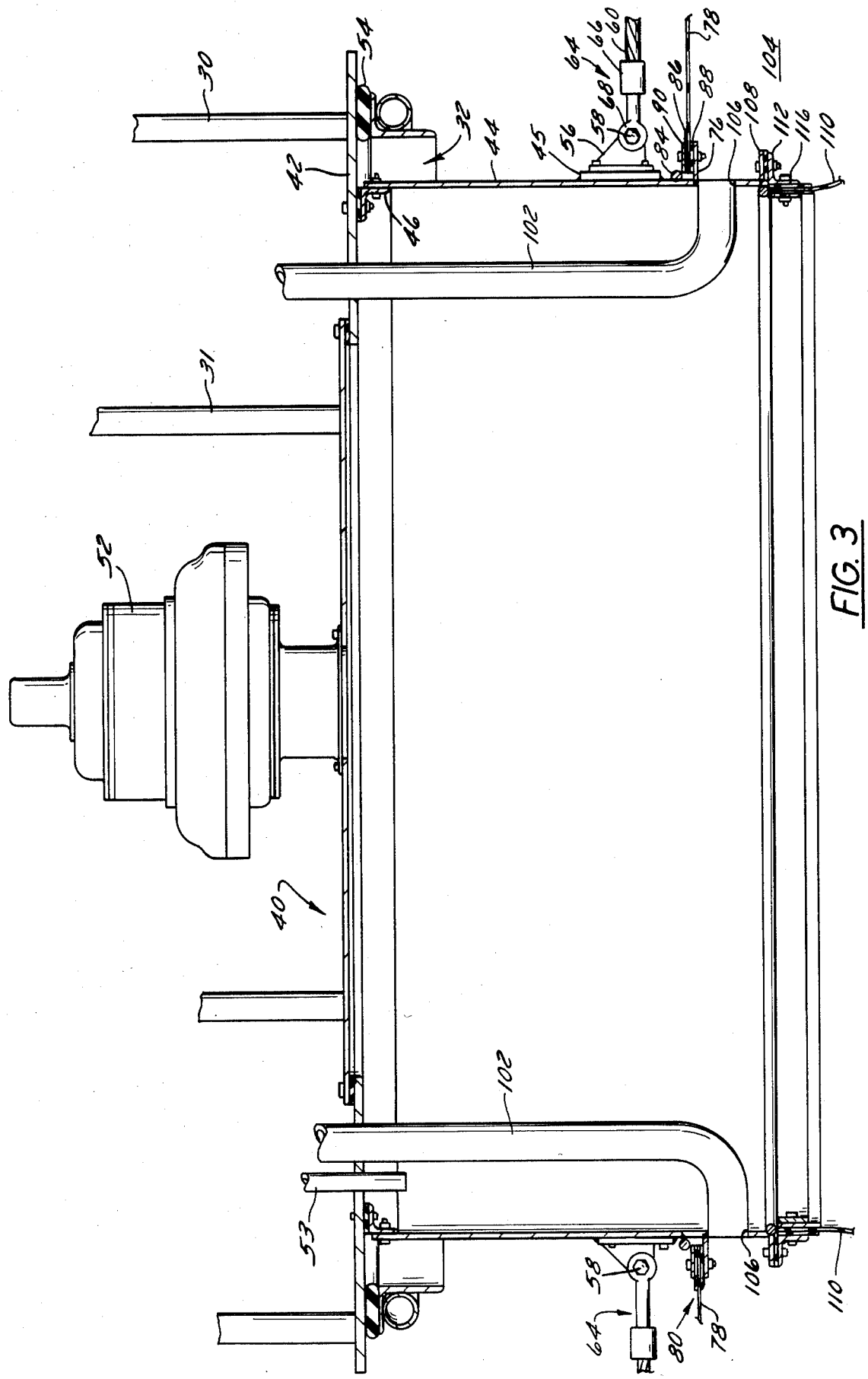
FIG. 3 is a detailed view of the gas well of the present invention.
Figure 4:
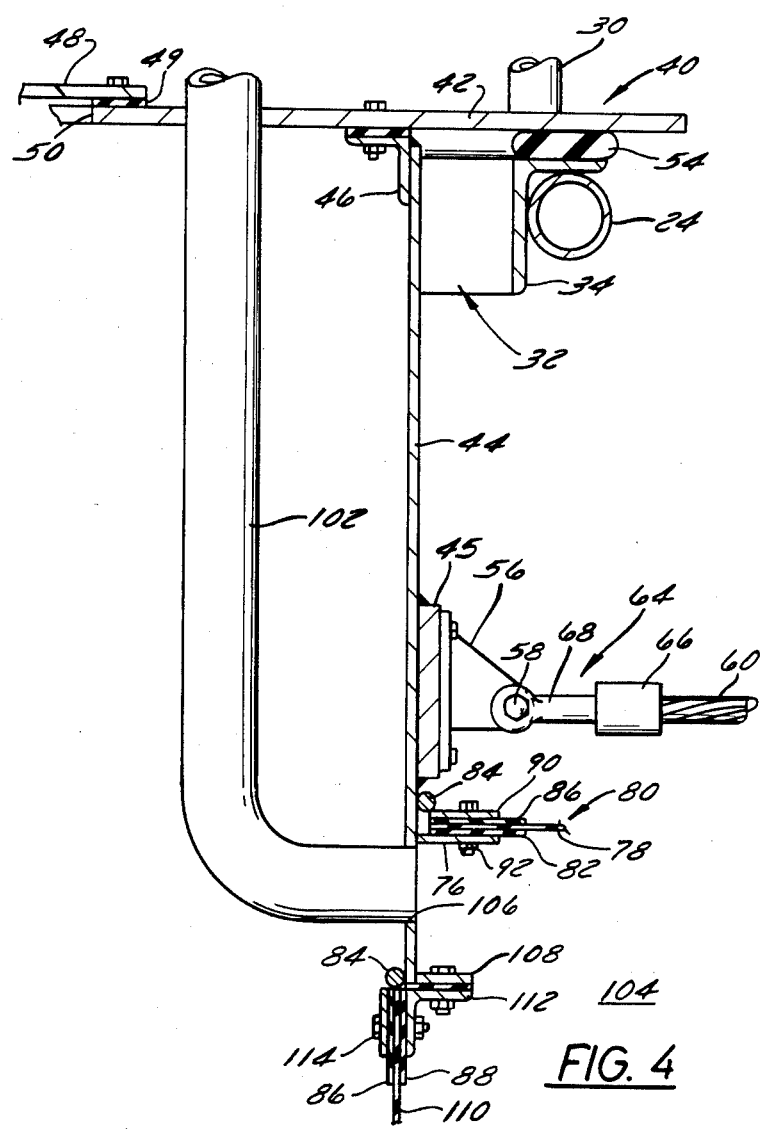
FIG. 4 is a detailed view of the gas well shown in FIG. 1.
Figure 5:
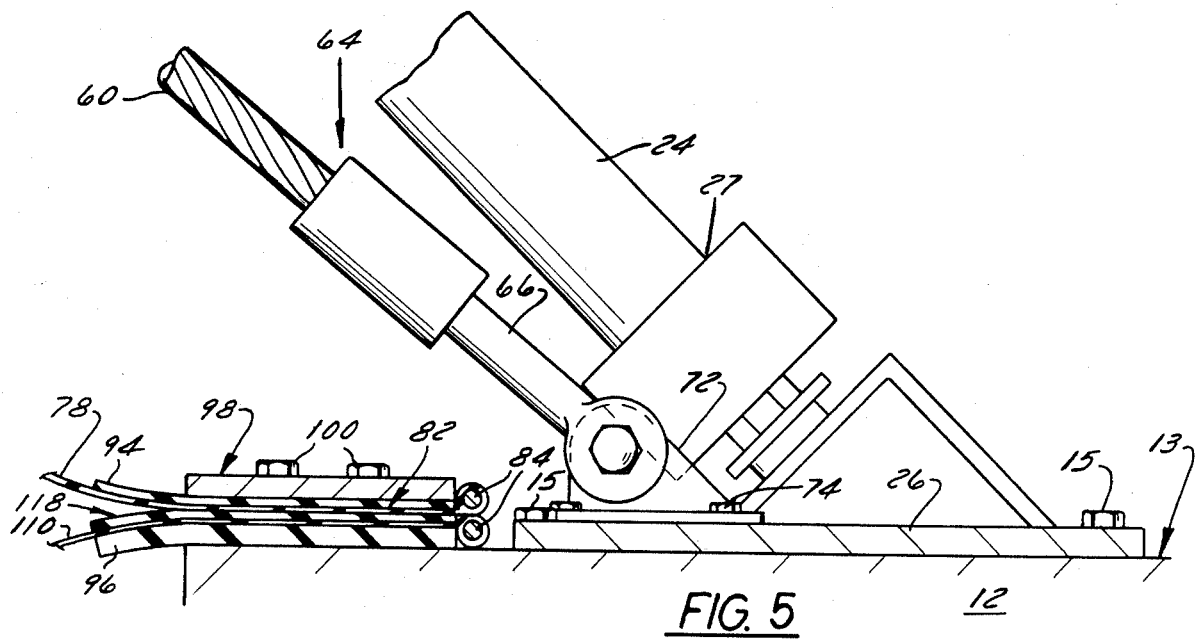
FIG. 5 is a detailed view of the top of the tank wall shown in FIG. 1.

Referring now to the drawings, wherein like reference characters designate identical or corresponding parts, an anaerobic digester tank for the treatment of wastewater is depicted, although the present invention may be employed in various types of tanks adapted to store specific gases or volatile liquids. Digester tank 10 is comprised of an annular wall 12 having a top 13 and a sloped floor 14 to facilitate the removal of settled waste solids, as well as the periodic draining of tank contents through conduit 16 for cleaning or maintenance. The position of conduit 16 may be varied to comport with industry practice. An inlet 18 is provided for the access of wastewater influent into tank 10. To be consistent with industry practice, additional inlets and outlets may be provided. A gas-impervious seal 20 is secured to the interior of tank wall 12 to provide protection for the variable volume of gas to be contained therein.

Tank 10 is provided with a gas well support structure 22, which in the preferred embodiment is dome-shaped, but may take other forms without betraying the spirit of the present invention. For purposes of cost reduction, the preferred structure 22 is not closed, but is essentially an open latticework of tubular segments 24 arranged in a pattern for efficient strength maximization. In the present invention, each segment 24 is fabricated of a material having properties similar to anodized aluminum or galvanized steel. The segments are assembled by any suitable means, such as bolting or welding.

Support structure 22 is also provided with a plurality of base plates 26 which are secured to the top 13 of wall 12 by anchor bolts 15. Selected segments 24 are adapted to lockingly engage base plates 26 at point 27 using conventional locking means.

Structure 22 is further provided with an access stairway 28 and railing 30 which leads to the central access aperture 32, circumscribed by rim 34 of structure 22.

Inserted into access aperture 32 is floating gas well 40, preferrably comprising a top plate 42 adequately overlapping rim 34, and a vertically depending, substantially cylindrical frame ring 44. If the top plate 42 is designed to not overlap rim 34, the gas well 40 may engage support structure 22 by means of a plurality of outwardly projecting support members (not shown). Frame ring 44 is secured to top plate 42 via 'L'-bracket 46 or by welding. Top plate 42 is also provided with a detachable manhole cover 48, gasket 49 and access port 50, and at least one pressure/vacuum release valve 52 and gas takeoff 53. Railing 31 facilitates access to manhole cover 48.

In order to adequately adapt to variations in internal tank pressure, gas well 40 should be capable of relatively free lateral movement in any direction. This goal is achieved by the installation of a resilient support cushion 54 between the outer edge of the top plate 42 or equivalent structural member and rim 34. Cushion 54 may be secured either to top plate 42 or rim 34, and, once secured, protects both surfaces from potentially damaging abrasion.

Frame ring 44 is provided with an annular tension ring 45 to which is attached a plurality of radially positioned lugs 56, each having an aperture 58. Because of the large number of lugs and the relatively small diameter of the tension ring 44, the lugs 56 may be provided in two alternating lengths (not shown) to stagger their distance from frame ring 44. This facilitates the installation of cables 60 by allowing room to manipulate the mounting bolts 70. Lugs 56 and tension ring 45 are preferably located low enough on frame ring 44 to allow gas well 40 to rise vertically an acceptable distance without incurring potentially damaging contact between lugs 56 and rim 34. In practice, however, it has been observed that under normal operational conditions, when tank 10 is filled with pressurized gas, the vertical movement of gas well 40 is negligible.

A plurality of radially-positioned flexible support members 60 connect gas well 40 with tank wall 12. Support members may be chains, ropes, tie bars or other suitable equivalent, but are preferably comprised of steel cables, each having a gas well end 62 and a base end 64. Gas well end 62 is provided with an open clevis socket 66 and an eyelet 68 which is pivotally secured to mounting lug 56 by bolt or pin 70. The base end 64 of each cable 60 is also provided with an open clevis socket 66 and an eyelet 68 which is secured to anchor plate 26 at lug 72.

Frame ring 44 is also provided with an outwardly projecting annular flange 76, which serves as a mounting point for flexible outer air retention membrane 78. Any reinforced polymeric material which is gas-impervious and chemical resistant may be used to manufacture membrane 78. Membrane 78 is essentially donut-shaped, having a central aperture and inner and outer peripheral margins, 80 and 82, respectively. Each margin 80, 82 is provided with an annular bead 84 of rope-like material.

Membrane 78 is sealingly secured to gas well 40 in the following manner. The inner margin 80 is sandwiched between two resilient annular gaskets, designated as upper gasket 86 and lower gasket 88. Lower gasket 88 rests upon flange 76, and upper gasket 86 is covered by annular plate 90. A plurality of mounting bolts or studs 92 secure the assembly comprised of plate 90, gaskets 86, 88, membrane 78 and flange 76 in a sealingly secure fashion.

The outer margin 82 of membrane 78 is sealingly secured to the top 13 of wall 12 in a similar fashion, employing gaskets 94 and 96, annular plate 98, and anchor bolts or studs 100.

Gas well 40 is further provided with at least one air intake 102 for filling the pressure cavity 104. Air intakes 102 are routed through holes in top plate 42 and a port 106 in frame ring 44, the latter directly below flange 76, and may be connected to an external blower assembly (not shown).

Directly beneath air intake port 106, and at the lower edge of ring 44, a second annular flange 108 is secured. Inner gas storage membrane 110 may be mounted to flange 108 in a fashion similar to that described for membrane 78 and flange 76. To enable the two membranes to be installed or replaced separately, an annular 'L'-bracket 112 may be secured to flange 108, which orients the supplemental membrane attachment 90° from that of membrane 78. As was described above, a pair of gaskets 86, 88, a separate annular clamping bar 114 and additional mounting bolts 116 will be employed. The outer margin 82 of membrane 110 is secured to wall 12 directly beneath membrane 78, being separated therefrom only by a sealing gasket 118.

In operation, when tank 10 is empty or has been relieved of evolved gas through takeoff 53, gas well 40 rests upon the rim 34 of support structure 22, being cushioned by pads 54. The cables 60 and membranes 78 and 110 are in a slackened condition. The combined weight of the gas well 40, cables 60 and membranes 78 and 110 are not sufficient to place undue strain upon support structure 22.

As gas is evolved, and/or as stored gas is fed into tank 10, cavity 104 will be pressurized to exert pressure upon the incoming gas. As the gas volume in the tank 10 increases, membrane 78 exerts tension upon cables 60. Until this tension equalizes throughout the tank, some cables may be subject to more stress than others. Thus, the gas well will shift laterally in response to this tension equalization process. Since the gas well 40 is not connected to the support structure, the stress loading experienced by the gas well is transmitted through the cables to wall 12, and not through structure 22.

Figure 6:
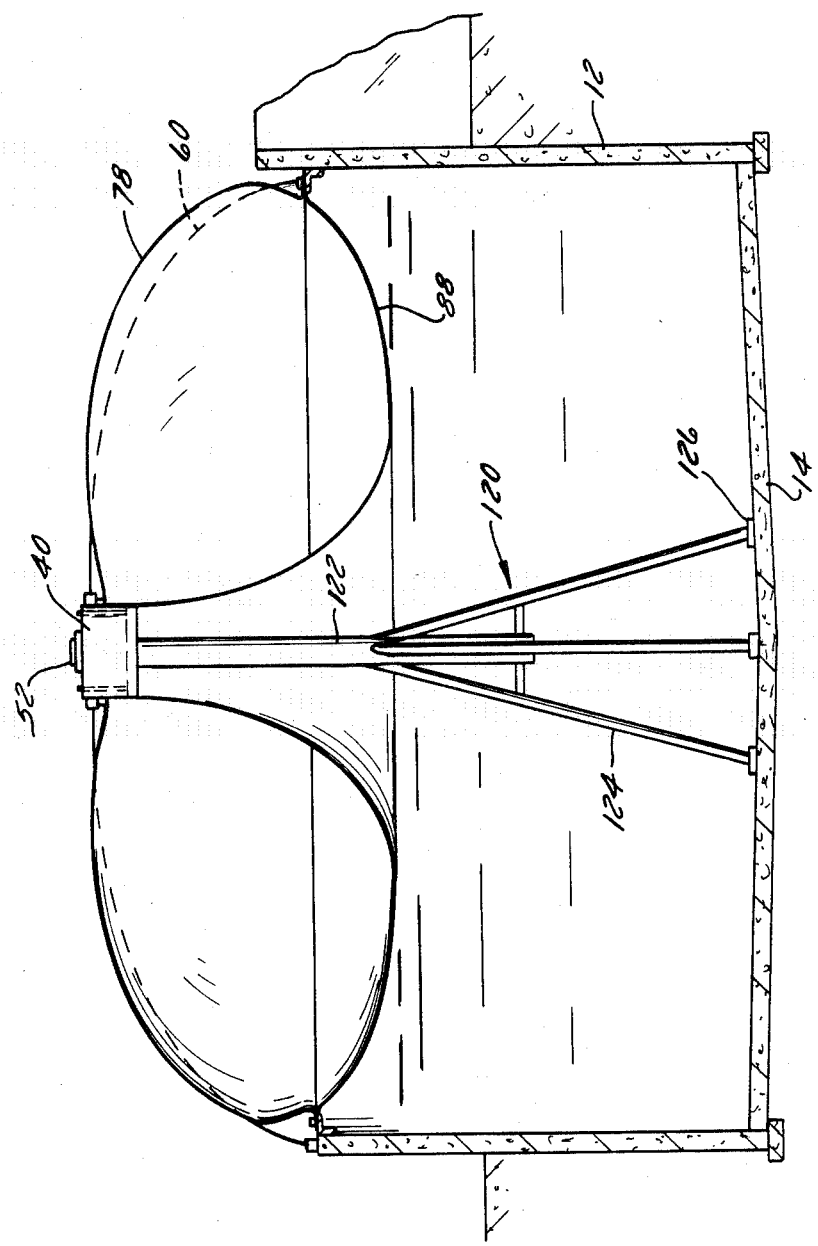
FIG. 6 is a side elevation in partial section of an alternate embodiment of the present invention.
Figure 7:
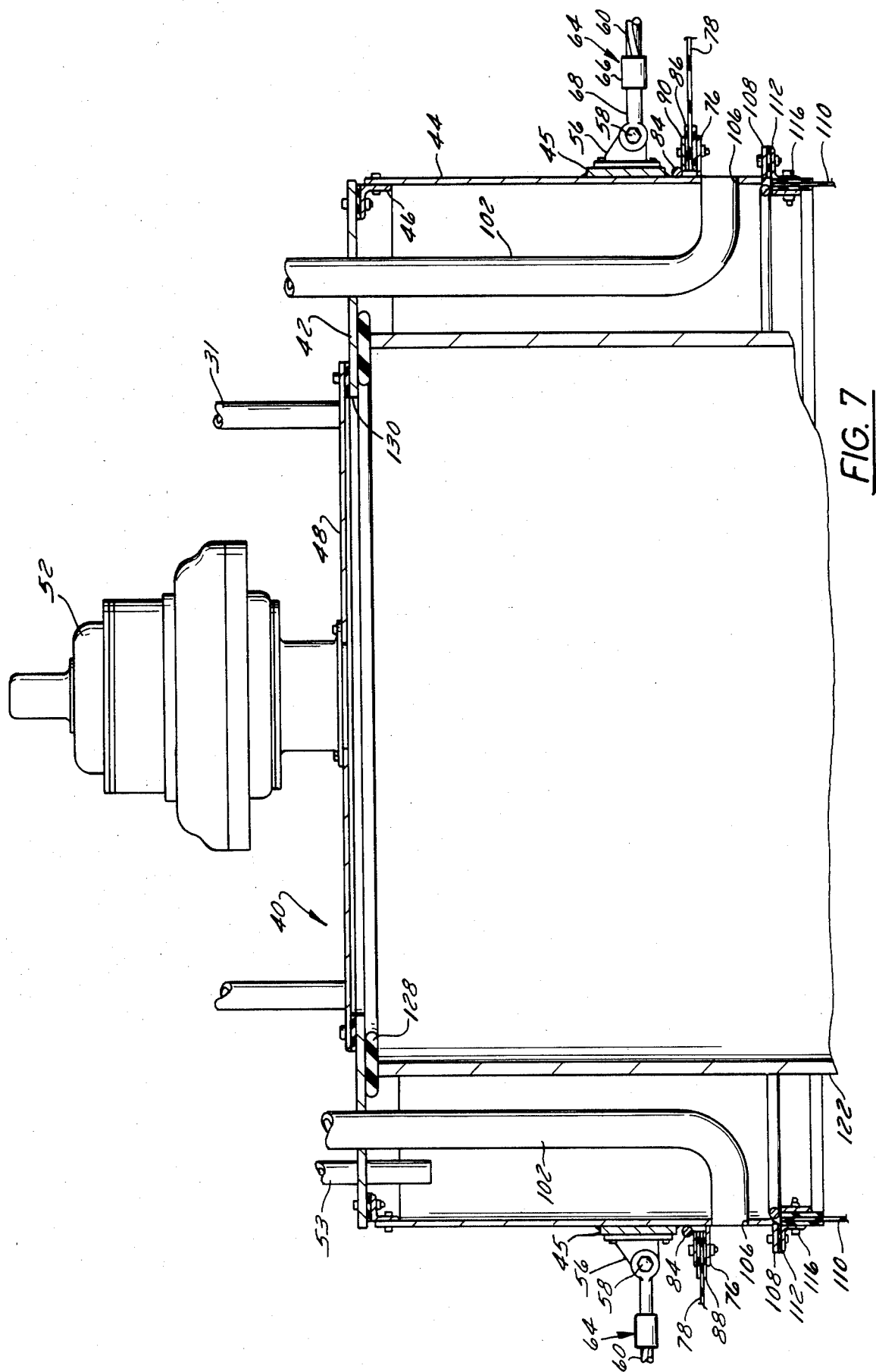
FIG. 7 is a detailed side elevation in partial section of the gas well depicted in FIG. 6.

Referring now to FIGS. 6 and 7, an alternate embodiment of the present invention is disclosed wherein the support structure consists of a centrally located vertical support pier 120. Pier 120 may be comprised of a tubular center section 122 to which are fixed three legs 124 in tripod arrangement. Legs 124 are secured to tank floor 14 by means of load bearing plates 126. Referring to FIG. 7, gas well 40 is floatably mounted to the top of center section 122. In similar fashion to pads 54, resilient pads 128 are positioned at the top of section 122 to prevent abrasion between top plates 42 and section 122. Also, pads 128 may be secured either to top plate 42 or section 122. Manhole cover 48 is located over access aperture 130 which in turn leads to the interior of center section 122.

Thus, the present invention discloses a gas collection and storage system comprised of a tank having a gas well support structure and a free-floating gas well suspended by cables so that the outwardly directed loads exerted by pressurized gas will be transmitted to the tank wall and not to the support structure.

Although a particular embodiment of this process has been described, it will be obvious to persons skilled in the art that changes and modifications might be made without departing from the invention in its broader aspects.

What is claimed is:

1. In a pressurized gas storage tank having a floor and an outer wall, a gas well support structure mounted over said tank and having an access aperture, a floating gas well housed in the access aperture and movably supported therein for movement with respect to the gas well support structure in response to changes in gas pressure in the gas storage tank, and the gas storage tank including an inner gas storage membrane and an outer air sealing membrane, each of said membranes being attached at said outer peripheries to said wall and at said inner peripheries to the floating gas well, said gas well comprising:
   a frame having a top plate with an access port and a vertically depending portion with a peripheral configuration approximating said inner periphery of said membranes;
   a plurality of flexible cables, each of the cables having a well end and a base end, said well end being pivotally connected to said vertically depending portion of said frame, and said base end being pivotally fixed to said tank wall;
   means for attaching the inner periphery of the outer air sealing membrane to the vertically depending portion of the frame in sealed relation, the means for attaching being below the well ends of the cables;
   means for attaching the inner periphery of the inner gas storage membrane to the vertically depending portion of the frame in sealed relation and below the means for attaching the inner periphery of the outer air sealing membrane; and
   wherein said membranes are attached to said vertically depending portion of said frame in relation to the connections of said flexible cables such that when said tank becomes inflated with either pressurized air or gas, the outwardly-directed stress loads created thereby are accommodated by said flexible cables and transferred to said tank wall.

2. The apparatus defined in claim 1 wherein said gas well is provided with support means to interface with said support structure.

3. The apparatus defined in claim 2 wherein said interfacing portion is provided with low friction support cushioning means to protect said support structure when said gas well floats in response to tension exerted upon the flexible support members by said pressurized gas or air.

4. The apparatus defined in claim 1 wherein said gas well support structure is of latticed construction and rests upon said tank wall.

5. The apparatus defined in claim 1 wherein said gas well support structure is comprised of a center pier mounted to said tank floor.

6. A gas collection and storage system comprising:
   a storage tank with walls and a floor;
   a rigid, latticed support structure mounted upon said tank, said support structure including a central aperture;
   a floating gas well positioned within said aperture and movably supported in the aperture for movement with respect to the support structure in response to changes in gas pressure in the storage tank and comprising:
   a cylindrical, vertically depending frame;
   a top plate fixed to said frame, engaging said support structure adjacent to said aperture;
   an inner gas retention membrane being sealingly secured to said frame and to said wall of said tank;
   an outer air retention membrane extending over the top of said gas retention membrane, said outer air retention membrane being sealingly secured to said frame and to said wall of said tank;
   a plurality of support cables radially arranged around said gas well, each of said cables having opposite ends, one end pivotally attached to said frame, and the other end pivotally attached to said wall;
   wherein said gas well is floatably supported by said support structure so that as the gas or air pressure increases, the resulting stress loads on said membranes are absorbed by said well, said cables and said wall and not by said support structure.

7. A gas collection and storage system comprising:
   a storage tank with walls and a floor;
   a center pier having an upper margin and mounted upon said tank floor;
   a floating gas well positioned upon said pier for movement with respect to said pier in response to changes in gas pressure in said storage tank and comprising:
   a cylindrical, downwardly depending frame;
   a top plate fixed to said frame and slidably engaging said upper margin of said center pier;
   an inner gas retention membrane being sealingly secured to said frame and to said wall of said tank;
   an outer air retention membrane extending over the top of said gas retention membrane said outer air retention membrane being sealingly secured to said frame and to said wall of said tank;
   a plurality of flexible support cables radially arranged around said gas well, each of said cables having opposite ends, one end pivotally attached to said frame, and the other end pivotally attached to said wall;
   wherein said gas well is floatably supported by said support structure so that as the volume of gas or air pressure increases, the resulting stress loads on said membranes are absorbed by said well, said cables and said wall.

* * * * *